(12) United States Patent
Bierhuizen et al.

(10) Patent No.: US 7,905,605 B2  
(45) Date of Patent: Mar. 15, 2011

(54) MULTI-PRIMARY LED PROJECTION SYSTEM

(75) Inventors: Serge J. Bierhuizen, Milpitas, CA (US); Gerard Harbers, Sunnyvale, CA (US)

(73) Assignees: Koninklijke Philips Electronics N.V., Eindhoven (NL); Philips Lumileds Lighting Company, LLC, San Jose, CA (US)

( * ) Notice: Subject to any disclaimer, the term of this patent is extended or adjusted under 35 U.S.C. 154(b) by 995 days.

(21) Appl. No.: 11/610,242

(22) Filed: Dec. 13, 2006

(65) Prior Publication Data

US 2008/0143967 A1   Jun. 19, 2008

(51) Int. Cl.  
    *G03B 21/14* (2006.01)

(52) U.S. Cl. ............... 353/31; 353/94; 353/20; 353/8; 348/771; 349/9

(58) Field of Classification Search ............... 353/7, 8, 353/31, 33, 34, 37, 94, 20; 349/5, 7, 8, 9, 349/15; 362/231, 234; 359/464; 348/60  
See application file for complete search history.

(56) References Cited

U.S. PATENT DOCUMENTS

| | | | |
|---|---|---|---|
| 5,428,408 A | 6/1995 | Stanton | |
| 6,028,694 A | 2/2000 | Schmidt | |
| 6,552,754 B1 | 4/2003 | Song et al. | |
| 6,648,475 B1 * | 11/2003 | Roddy et al. | 353/31 |
| 6,769,772 B2 * | 8/2004 | Roddy et al. | 353/31 |
| 6,991,336 B2 | 1/2006 | Matsui | |
| 7,159,987 B2 * | 1/2007 | Sakata | 353/31 |
| 7,234,820 B2 * | 6/2007 | Harbers et al. | 353/94 |
| 7,360,900 B2 * | 4/2008 | Sakata et al. | 353/20 |
| 2004/0070736 A1 | 4/2004 | Roddy et al. | |
| 2005/0128441 A1 | 6/2005 | Morgan | |
| 2005/0134811 A1 | 6/2005 | Magarill et al. | |
| 2005/0205884 A1 | 9/2005 | Kim et al. | |
| 2005/0224826 A1 | 10/2005 | Keuper et al. | |
| 2005/0270775 A1 * | 12/2005 | Harbers et al. | 362/231 |
| 2006/0268237 A1 | 11/2006 | Lu | |

OTHER PUBLICATIONS

International Search Report and Written Opinion, 11 pages.  
International Search Report and Written Opinion, 11 pages, Apr. 28, 2008.

* cited by examiner

*Primary Examiner* — William C Dowling

(57) ABSTRACT

A multi-primary light emitting diode system includes the use of a polarization based dichroic element to combine light from different color channels. At least one of the color channels includes two light emitting diodes that produce light with a different range of wavelengths. The use of the polarization based dichroic element permits overlapping spectra from different color channels to be combined without loss. Accordingly, the brightness of the system is improved relative to conventional systems in which losses occur when combining overlapping spectra from different channels.

28 Claims, 7 Drawing Sheets

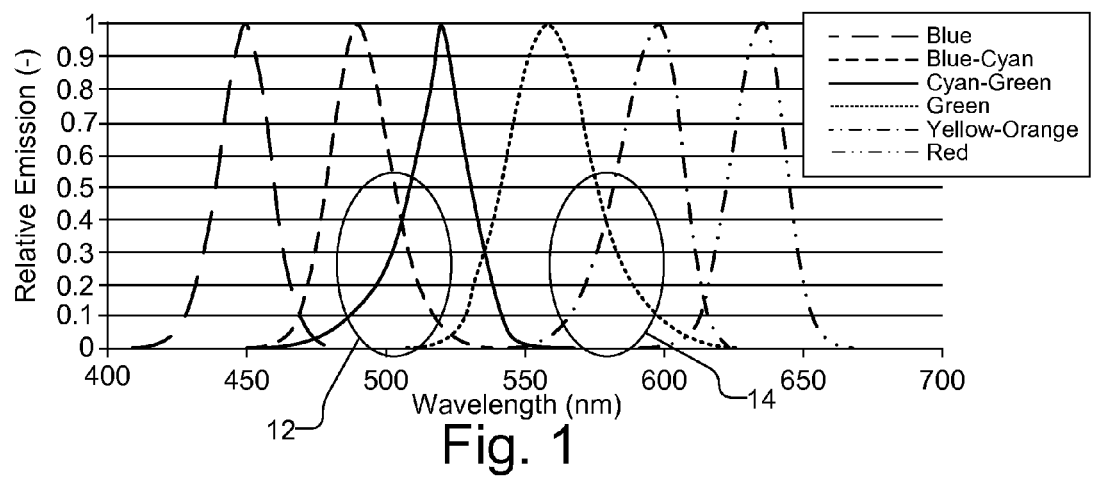
Fig. 1
(Conventional)
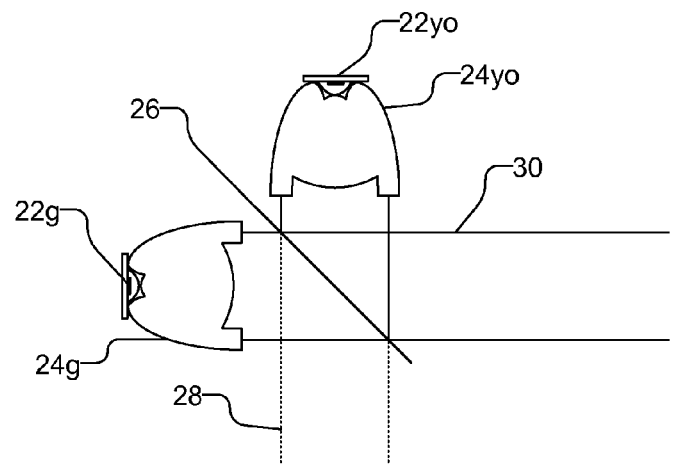
Fig. 2
(Conventional)

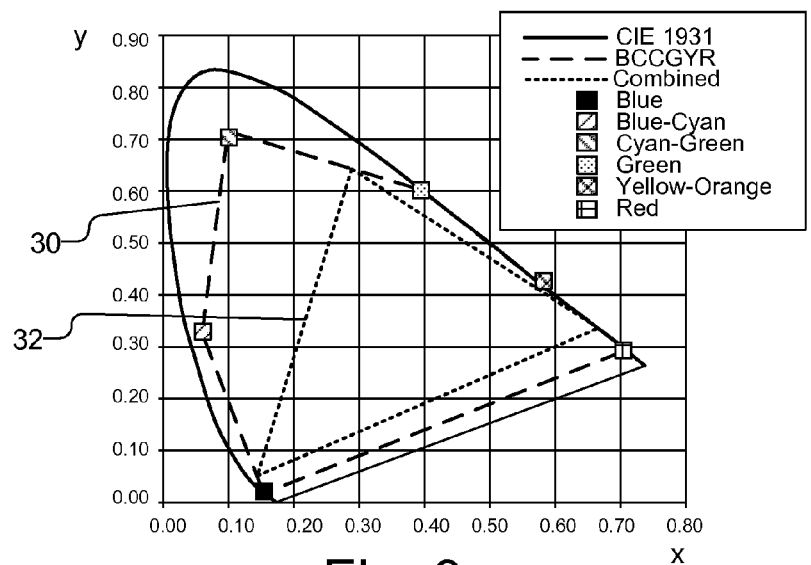
Fig. 3
(Conventional)

MULTI-PRIMARY LED PROJECTION SYSTEM

FIELD OF THE INVENTION

The present invention relates generally to projection systems that use light emitting diodes (LEDs), and in particular to a combining spectra in a multiple LED projection system.

BACKGROUND

Light emitting diode based projection systems combine different colors of light produced by multiple LEDs. The different colors of light may be combined to produce a source of white light, or alternatively, an optical display, sometimes referred to as micro-display, e.g., liquid crystal on silicon (LCOS) or digital light processing (DLP), may be used to impart image information on the combined light or on each color of light before the light is combined.

FIG. 1 is a graph illustrating the spectral curves of a six primary LED projection system, i.e., a projection system that combines the light from six differently colored LEDs. FIG. 1 illustrates the spectral curves for Blue, Blue-Cyan, Cyan-Green, Green, Yellow-Orange, and Red colored light. As can be seen, in the areas 12 and 14, for example, there is substantial overlap in the spectra. The overlap is problematic as it leads to a loss of brightness in conventional systems.

FIG. 2 schematically illustrates two LEDs 22g and 22yo, which produce green and yellow-orange light, respectively, along with associated lenses 24g and 24yo. Conventionally, light from the LEDs 22g and 22yo is combined using a dichroic filter 26, which reflect some wavelengths and transmit other wavelengths. For example, the dichroic filter 26 may reflect wavelengths above 570 nm and transmits wavelengths below 570 nm. As can be seen in area 14 in FIG. 1, however, the spectral contribution from the Yellow-Orange light below 570 nm will be lost because it is transmitted through the dichroic filter 26, as indicated by the dotted lines 28 in FIG. 2, as opposed to being reflected by the dichroic filter 26 along the desired beam path 30. Thus, overlapping spectral contributions in multi-primary LED projection systems results in lost light when combining the different channels, and therefore a decrease in brightness.

FIG. 3 is a CIE 1931 color space chromacity diagram illustrating a six LED primary system. The space defined by the line 30 labeled "BCCGYR" is the gamut of color that can be matched by various combinations of the Blue, Blue-Cyan, Cyan-Green, Green, Yellow-Orange, and Red colored light. Conventionally, the multi-primary projection system combines the colors into Blue, Green and Red channels. Thus, the Blue and Blue-Cyan are combined into the Blue channel, the Cyan-Green and Green are combined into the Green channel and the Yellow-Orange and Red are combined into the Red channel. The spectral losses caused by the combination of these channels can be seen in areas 12 and 14 in FIG. 1. The space defined by the line 32 labeled "Combined" is the gamut of color that can be matched by various combinations of the Blue, Green and Red channels. As can be seen, conventional systems greatly limit the gamut of the color spectrum that can be produced.

Thus, conventional multi-primary LED light sources suffer from problems such as a loss of brightness and reduced color gamut. Improvements of multi-primary LED light sources, such as projection systems, are desirable.

SUMMARY

A multi-primary light emitting diode system includes the use of a polarization based dichroic element to combine light from different color channels. At least one of the color channels includes two light emitting diodes that produce light with a different range of wavelengths. The use of the polarization based dichroic element permits overlapping spectra from different color channels to be combined without loss. Accordingly, the brightness of the system is improved relative to conventional systems in which losses occur when combining overlapping spectra from different channels.

BRIEF DESCRIPTION OF THE DRAWINGS

FIG. 1 is a graph illustrating the spectral curves of a six primary LED projection system.

FIG. 2 schematically illustrates combining light from two LEDs.

FIG. 3 is a CIE 1931 color space chromaticity diagram illustrating a six LED primary system.

DETAILED DESCRIPTION

Figure 4:
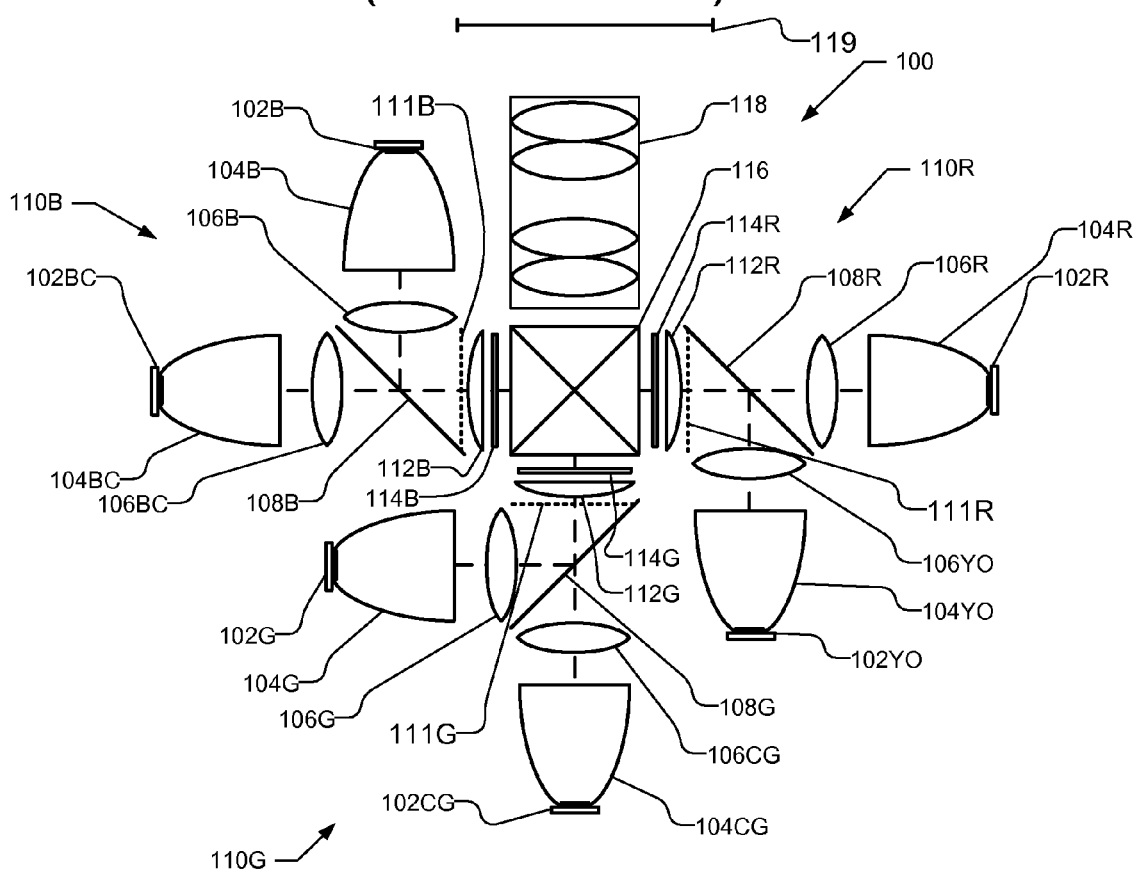
FIG. 4 is a multi-primary LED projection system that combines the light from multiple channels, at least one of which includes two different colored LEDs, using a polarization based dichroic element, in accordance with an embodiment of the present invention.

FIG. 4 is a multi-primary LED projection system 100 that combines the light from multiple channels, at least one of which includes two different colored LEDs, without a loss of brightness by using a polarization based dichroic element, such as a polarization dependent X-cube, in accordance with an embodiment of the present invention.

Projection system 100 is illustrated as including six LEDs 102B, 102BC, 102CG, 102G, 102YO, and 102R, sometimes collectively or individually referred to herein as LED(s) 102, each having a different color, Blue, Blue-Cyan, Cyan-Green, Green, Yellow-Orange, and Red, respectively. Associated with each LED 102 are one or more lenses 104 and 106 (labeled with a suffix, i.e., B, BC, CG, G, YO, and R, that corresponds with the LED 102 to which they are associated). A dichroic element 108B combines the light from the Blue LED 102B and the Blue-Cyan LED 102BC to form a Blue channel 110B. Similarly dichroic element 108G combines the light from the Green LED 102G and the Cyan-Green LED 102CG to form a Green channel 110G and dichroic element 108R combines the light from the Yellow-Orange LED 102YO and the Red LED 102R to form a Red channel 110R.

Polarizing elements 111B, 111G, and 111R receive the light from their associated dichroic elements 108B, 108G, and 108R and produce a polarization state in the combined light. The polarizing elements 111B and 111R are configured to produce one polarization orientation in the light in the Blue and Red channels 110B, 110R, respectively, while the polarizing element 111G is configured to produce an orthogonal polarization orientation in the light in the Green channel 110G. In one embodiment, the polarizing elements 111B, 111G, and 111R are wire grid polarizers, but other polarizing elements may be used if desired. In another embodiment, polarizing elements 111B, 111G, and 111R are replaced with polarizing elements that are coupled to each LED 102, i.e., the light is polarized prior to the dichroic elements 108. In yet another embodiment, the LEDs 102 may produce polarized light, such as U.S. Ser. No. 10/804,314, entitled "Optical System for Light Emitting Diodes" filed on Mar. 19, 2004, and U.S. Ser. No. 10/805,424, entitled "Semiconductor Light Emitting Devices Including In-Plane Light Emitting Layers" filed Mar. 19, 2004, both of which are assigned to the assignee of the present disclosure and both of which are incorporated herein by reference in their entireties.

Lenses 112B, 112G, and 112R receive the light from each channel 110B, 110G, and 110R, respectively, and focus the light through a transmissive microdisplay 114B, 114G, and 114R, such as a high temperature poly-silicon (HTPS) liquid crystal microdisplay. The light that is transmitted through the microdisplays 114 is combined with a polarization based dichroic element, such as polarization dependent X-cube 116. The microdisplays are imaged by a lens 118 onto a screen 119. The polarization dependency of the X-cube 116 permits the creation of large overlapping recombination regions, which avoids the loss in brightness conventionally associated with overlapping spectra, as well as enabling a larger color gamut. The combination of the channels with large overlapping recombination regions, e.g., combining the same wavelengths from both channels, is different than the inadvertent mixing of one channel with the inadvertent leakage flux from another channel. Leakage flux is on the order of approximately 2% or less, and thus, provides very little brightness or color gamut benefit. Thus, the wavelengths in the channels that are combined, in the present embodiment, are the primary flux, e.g., greater than 2% of the flux, and more particularly greater than approximately 50% of the flux.

Figure 5:
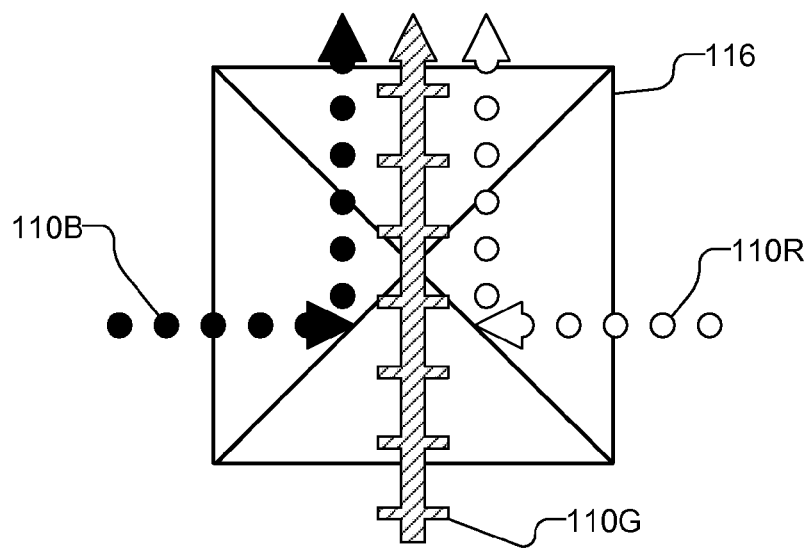
FIG. 5 illustrates schematically the combination of three color channels using a polarization dependent dichroic X-cube.

FIG. 5 illustrates schematically the combination of the Blue channel 110B, Green Channel 110G and the Red channel 110R with a polarization dependent X-cube 116. FIG. 5 illustrates the polarization states of the different channels, e.g., caused by polarizing elements 111B, 111G, and 111R (shown in FIG. 4) by dots or lines, e.g., the polarization axis is into the page or along the face of the page, respectively. As can be seen in FIG. 5, the Blue channel 110B and Red channel 110R have polarization states that are oriented orthogonally to the polarization state of the Green channel 110G.

Figure 6:
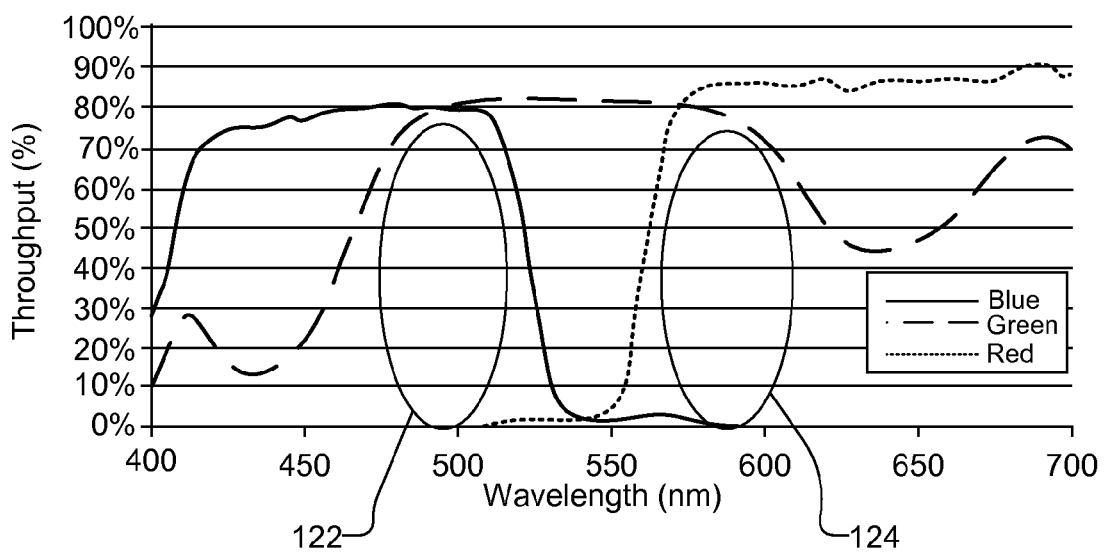
FIG. 6 is a graph of the throughput for a polarization dependent dichroic X-cube for orthogonal polarization axes.

FIG. 6 is a graph of the throughput for a polarization dependent dichroic X-cube for orthogonal polarization axes. The Throughput (%) in FIG. 6 illustrates the transmission of the Green light as well as the reflection of the Blue and Red light, as illustrated in FIG. 5. As can be seen, the transmitted wavelengths for the Green light substantially overlaps (in areas 122 and 124) the transmitted (reflected) wavelengths for the Blue and Red light, which have polarization states that are orthogonal to the Green light.

Figure 7A:
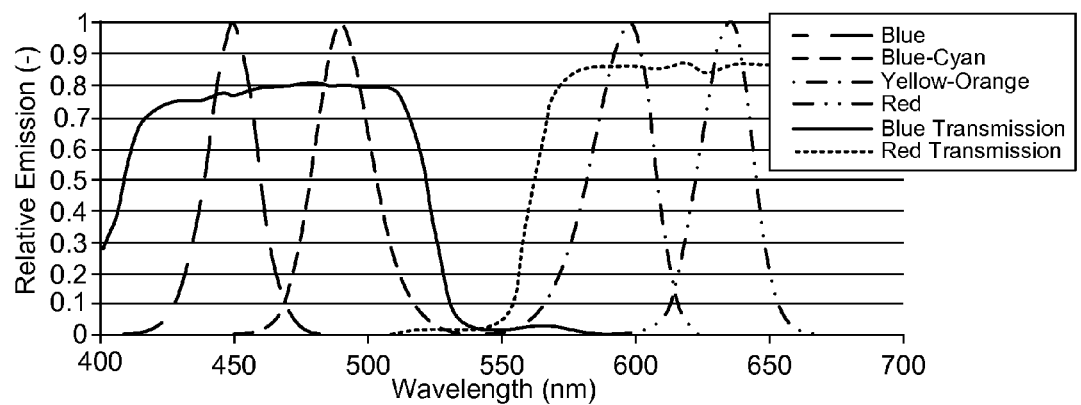
FIGS. 7A and 7B graphically illustrate the transmission of a polarization dependent dichroic X-cube with respect to the spectra in different color channels.
Figure 7B:
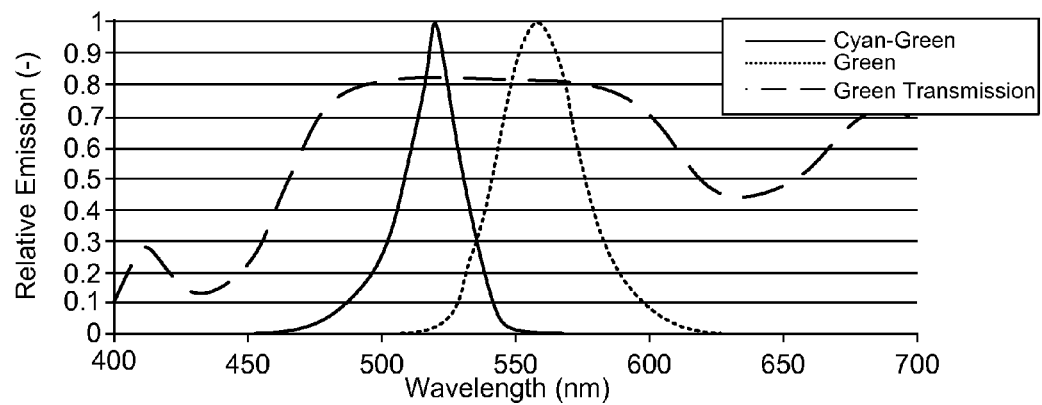

FIGS. 7A and 7B graphically illustrates the transmission of the polarization dependent dichroic X-cube 116 with respect to the spectra in the Blue, Red channels and the Green channel, respectively. The Green channel is shown in a different graph than the Blue and Red channels so that the curves can be clearly seen. As shown in FIG. 7A, the Blue channel includes two ranges of wavelengths including, Blue and Blue-Cyan, while the Red channel also includes two ranges of wavelengths Yellow-Orange and Red. The spectral emissions of the Blue channel and the Red channel are overlain with the Blue transmission and Red transmission from the X-cube 116. FIG. 7B similarly shows the spectral emissions of the Green channel, which includes two ranges of wavelengths Cyan-Green and Green, overlain with the Green transmission from the X-cube 116. Thus, as can be seen in FIGS. 7A and 7B, the full range of wavelengths in each color channel can be transmitted by the X-cube 116.

The X-cube 116 can combine the overlapping wavelengths because they have different polarization states. Accordingly, with the use of the X-cube 116, the losses caused by overlapping wavelengths, illustrated in FIG. 1 for example, are eliminated. It should be understood that while each channel is described as having two LEDs 102 that produce two different ranges of wavelengths, if desired, only one channel may have two LEDs that produce the two different ranges of wavelengths. For example, it may be particularly advantageous to include two or more ranges of wavelengths in the Red channel. Moreover, it should be understood that the different ranges of wavelengths may include some overlapping wavelengths, which is illustrated in FIGS. 7A and 7B.

Figure 8:
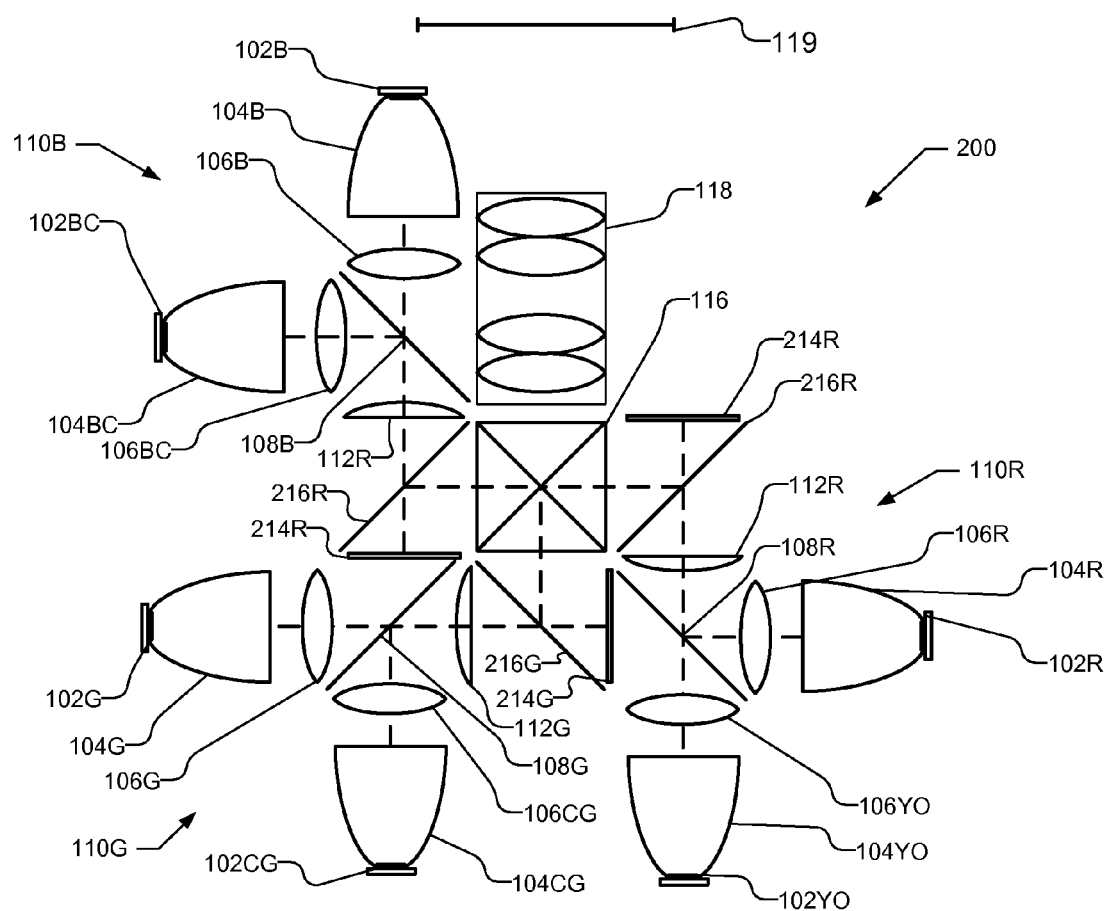
FIG. 8 is another embodiment of a multi-primary LED projection system that combines the light from multiple channels, at least one of which includes two different colored LEDs, using a polarization based dichroic element.

FIG. 8 is a multi-primary LED projection system 200 in which a polarization based X-cube is used to combine different color channels, similar to projection system 100, shown in FIG. 4, like designated elements being the same. The projection system 200, however uses a reflective microdisplay 214B, 214G, and 214R, such as a DLP or other Liquid Crystal on Silicon (LCoS) type microdisplay, along with an associated polarization dependent beam splitter 216B, 216G, and 216R.

Figure 9:
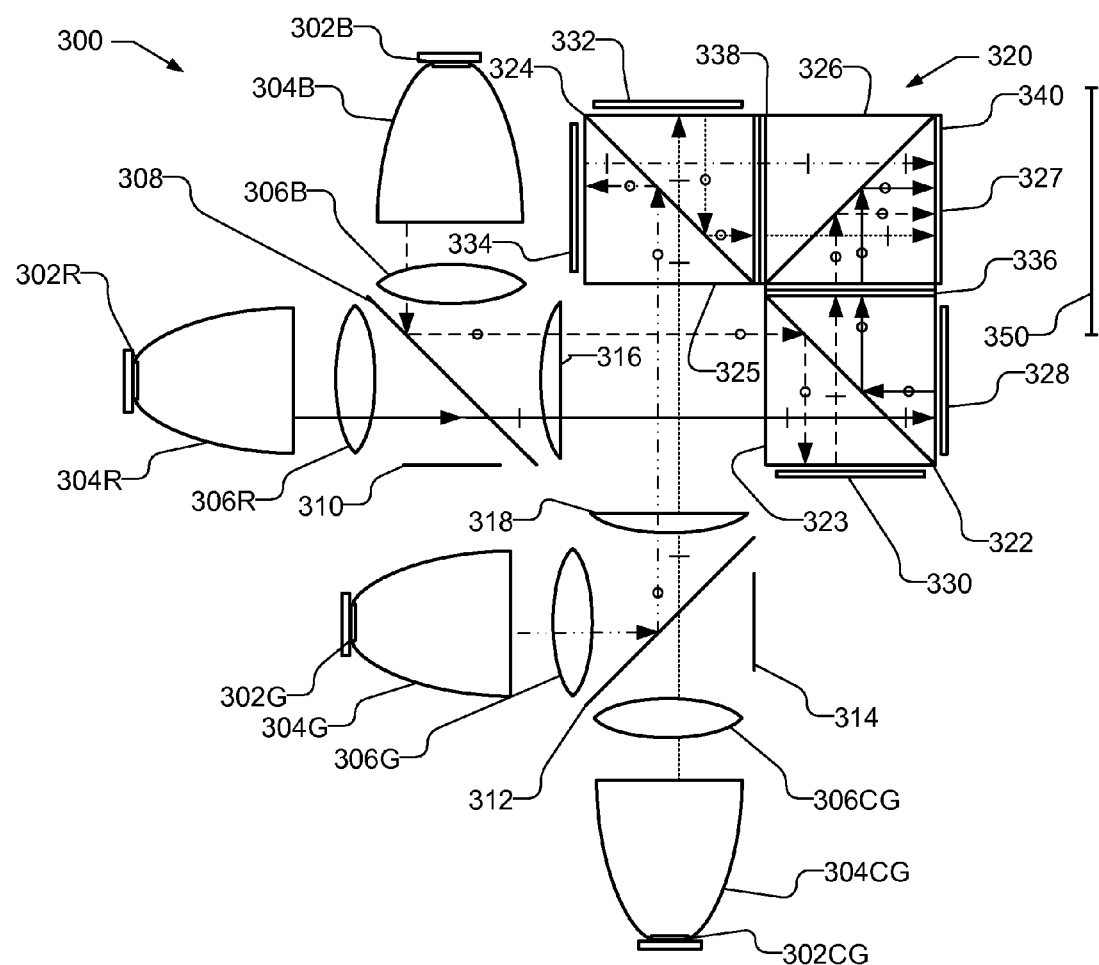
FIG. 9 is yet another embodiment of a multi-primary LED projection system that combines the light from multiple channels, at least one of which includes two different colored LEDs, using a polarization based dichroic element.

FIG. 9 is another multi-primary LED projection system 300 in which a polarization based dichroic element is used to combine different color channels. Projection system 300 is illustrated as including four LEDs 302B, 302R, 302CG, and 302G, sometimes collectively or individually referred to herein as LED(s) 302, each having a different color, Blue, Red, Cyan-Green, and Green, respectively. Associated with each LED 302 are one or more lenses 304 and 306 (labeled with a suffix, i.e., B, R, CG, and G), that corresponds with the LED 302 to which they are associated).

A reflective polarizer element 308, such as a wire grid polarizer, combines the light from the Blue LED 302B and the Red LED 302R. A mirror 310 may be used for polarization recycling. As can be seen, however, the polarizer element 308 produces orthogonal polarization states in the Blue light and the Red light. Similarly, a reflective polarizer element 312, e.g., wire grid polarizer, combines the light from the Green LED 102G and the Cyan-Green LED 102CG. Mirrors 310 and 314 may be used for polarization recycling. Again, the resulting combined light has two different polarization states, i.e., the Green light has a polarization state that is orthogonal to the polarization state of the Cyan-Green light. If desired, the reflective polarizer element 308 may be replaced with a dichroic element and separate polarizing elements on each LED 302, or polarized LEDs, to generate the same combined colors with orthogonal polarization states.

Lens 316 focuses the combined Red and Blue light into an entrance surface of the polarization based dichroic element 320, while lens 318 focuses the combined Green and Cyan-Green light into a separate entrance surface of the polarization based dichroic element 320.

The polarization based dichroic element 320 includes three polarizing beam splitters 322, 324, and 326, and four microdisplays 328, 330, 332, 334. As illustrated, polarized Red light from the Red LED 302R is transmitted through the polarizer element 308 enters a first entrance face 323 of the dichroic element 320 and is transmitted by the polarized beam splitter 322 and received by microdisplay 328. The microdisplay 328 reflects and changes the polarization state of a portion of the Red light, which is reflected by the polarized beam splitter 322 passes through a Red/Blue filter 336 and reflected by polarized beam splitter 326 toward the exit surface 327 of the polarization based dichroic element 320.

The Blue light from the Blue LED 302B having the opposite polarization state as the Red light is reflected by the polarizer element 308 enters the first entrance face 323 of the dichroic element 320 and is reflected by the polarized beam splitter 322 and received by microdisplay 330. The microdisplay 330 reflects and changes the polarization state of a portion of the Blue light, which is transmitted by the polarized beam splitter 322 passes through the Red/Blue filter 336, which changes the polarization state of the Blue light, and is reflected by polarized beam splitter 326 toward the exit surface 327 of the polarization based dichroic element 320.

The Cyan-Green light from the Cyan-Green LED 302CG is transmitted through the polarizer element 312 enters a second entrance face 325 of the dichroic element 320 and is transmitted by the polarized beam splitter 324 and received by microdisplay 332. The microdisplay 332 reflects and changes the polarization state of a portion of the Cyan-Green light, which is reflected by the polarized beam splitter 324, passed through a Cyan Green/Green filter 338, which changes the polarization state of the Cyan-Green light, and is transmitted by polarized beam splitter 326 toward the exit surface 327 of the polarization based dichroic element 320.

The Green light from the Green LED 302G having the opposite polarization state as the Cyan-Green light is reflected by the polarizer element 312, enters the second entrance face 325 of the dichroic element 320 and is reflected by the polarized beam splitter 324 and received by microdisplay 334. The microdisplay 334 reflects and changes the polarization state of a portion of the Green light, which is transmitted by the polarized beam splitter 324, passed through Cyan Green/Green filter 338 and is transmitted by polarized beam splitter 326 toward the exit surface 327 of the polarization based dichroic element 320. A Green/Magenta filter 340 at the exit surface changes the polarization states of the Green and Cyan-Green light at the exit surface 327 of the polarization based dichroic element 320 so that the combined light has the same polarization states. The resulting light can then be focused onto a screen 350 with lenses (not shown), similar to that illustrated in FIG. 4.

Thus, with the use of a polarization based dichroic element 320, a four microdisplay system is enabled with a multi-primary LED, while using only three polarization beam splitters and only a few color films. If desired, however, one of the LEDs 302 may be eliminated and only three microdisplays used, which will result, however, in a smaller color gamut.

Figure 10:
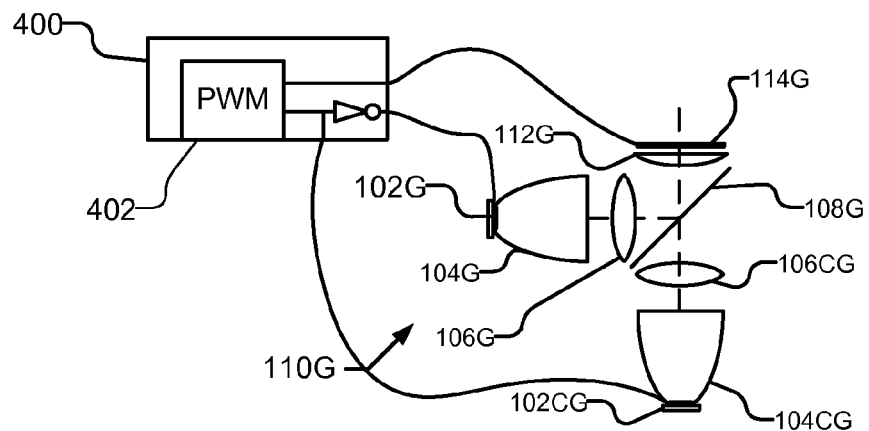
FIG. 10 illustrates a controller with a pulse width modulation circuit that controls one or more color channels in a multi-primary LED projection system.

FIG. 10 illustrates a controller 400 that may be used to control one or more color channels in a multi-primary LED projection system. For illustrative purposes, only the green channel 110G from FIG. 4 is shown in FIG. 10, but it should be understood that the same controller 400, or independent controllers may be used to control any other channel in the projection system. The controller 400 may be a power control circuit that includes a pulse width modulation (PWM) circuit 402 that is coupled to the LEDs in the channel, e.g., 102G and 102CG, in a complementary fashion, so that when one LED 102G is on, the other LED 102CG is off and vice versa. The PWM circuit 402 is also coupled to the microdisplay 114G so that the information provided by the microdisplay is synchronized with the LED that is on.

Figure 11:
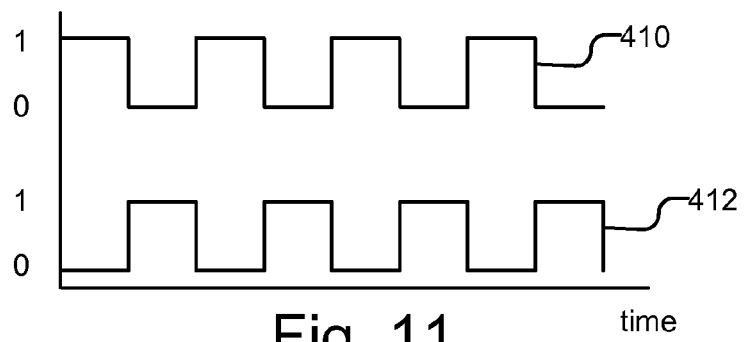
FIG. 11 illustrates controlling the LEDs in a color channel with a 50% PWM duty cycle.

FIG. 11 illustrates LEDs 102G and 102CG being controlled by controller 400 with a 50% PWM duty cycle, where the top square wave 410 represents the power provided to (and thus, the on/off state of) LED 102G and the bottom square wave 412 represents the power provided to (and thus, the on/off state of) LED 102CG. While the LED 102G is turned on and LED 102CG is off, the microdisplay 114G provides Green color data, and while the LED 102CG is turned on and LEDG is off, the microdisplay 114G provides Cyan-Green color data. Thus, by altering the duty cycle the channel 110G can be altered to provide more Green color information or more Cyan-Green color information.

Figure 12:
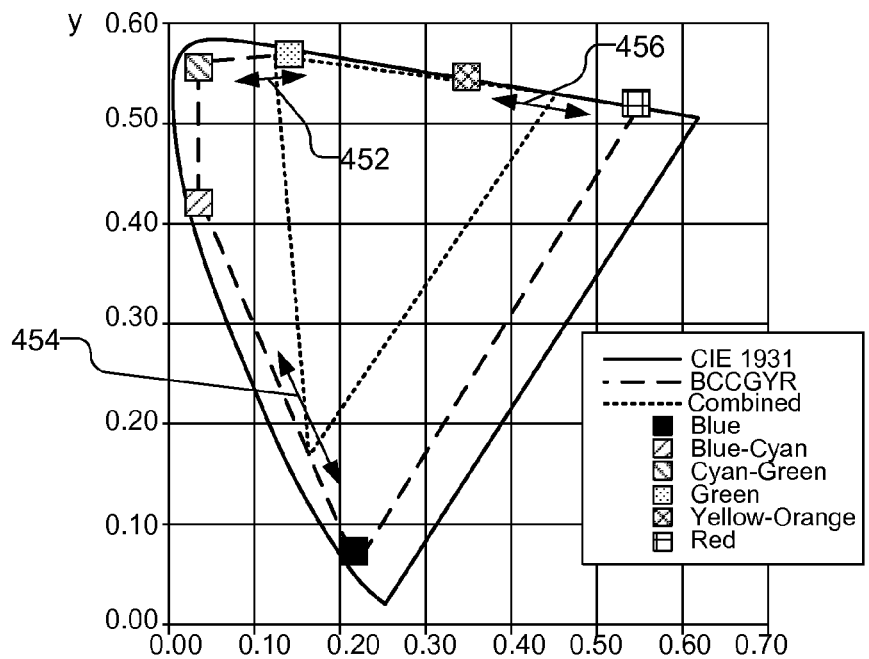
FIG. 12 is a another CIE 1931 color space chromacity diagram, similar to that shown in FIG. 3, but illustrating the effect of controlling the multi-primary LED projection system.

FIG. 12 is a another CIE 1931 color space chromacity diagram, similar to that shown in FIG. 3, but illustrating the effect of the controller 400 on the multi-primary LED projection system. As illustrated by the arrow 452, the Green channel can be varied anywhere between the Cyan-Green and the Green colors by appropriate PWM control of the LEDs 102CG and LEDG. For example, using a 50% duty cycle, the Green channel produces a color that approximately in the middle of the Cyan-Green and Green colors. However, by varying the duty cycle, the color provided in the Green channel can be shifted anywhere between Cyan-Green and Green, as indicated by arrow 452. Similarly, the Blue channel can be varied anywhere between the Blue and Blue-Cyan colors, as illustrated by arrow 454, and the Red channel can be varied anywhere between the Yellow-Orange and Red colors through appropriate PWM control of the LEDs, as illustrated by arrow 456.

Accordingly, as can be seen in FIG. 12, the color gamut is of the multi-primary LED projection system is both increased and controllable. Moreover, because the LEDs are driven using PWM, the current provided to each LED during its on phase can be increased, thereby increasing the luminance of each LED.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:
1. A projection system comprising:
   a first color channel that produces light having a first color, the first color channel comprising:
      a first light emitting diode that produces light having a first range of wavelengths;
      a second light emitting diode that produces light have a second range of wavelengths, the second range of wavelengths being different than the first range of wavelengths;
      a beam combining element positioned to receive the light having the first range of wavelengths and the light having the second range of wavelengths, the beam combining element combining the light having the first range of wavelength and the light having the second range of wavelengths to produce the light having the first color;

a second color channel that produces light having a second color, the second color being different than the first color, the second color channel having at least one light emitting diode that produces light having a third range of wavelengths the third range of wavelengths is different than the first range of wavelengths and the second range of wavelengths, wherein the light having the second color comprises the light having the third first range of wavelengths;

a first microdisplay positioned to receive and affect both the light having the first range of wavelengths and the light having the second range of wavelengths;

a second microdisplay positioned to receive and affect at least the light having the third range of wavelengths; and a polarization based dichroic element positioned to receive the light having the first color from the first color channel and the light having the second color from the second color channel, the polarization based dichroic element configured to combine the light having the first color and the light having the second color after the light having the first range of wavelengths and the light having the second range of wavelengths are affected by the first microdisplay and the light having the third range of wavelengths is affected by the second microdisplay.

2. The projection system of claim 1, wherein the beam combining element is a dichroic element or a reflective polarizing element.

3. The projection system of claim 1, wherein the light having the second color includes the third range of wavelengths, wherein at least a portion of the wavelengths in the second range of wavelengths and at least a portion of the wavelengths in the third range of wavelengths are the same wavelengths, and wherein the polarization based dichroic element is configured to combine the same wavelengths from the second range of wavelengths and the third range of wavelengths.

4. The projection system of claim 1, wherein the first microdisplay is positioned between the beam combining element and the polarization based dichroic element and the second microdisplay is positioned between the at least one light emitting diode of the second color channel and the polarization based dichroic element.

5. The projection system of claim 1, further comprising a pulse width modulation circuit complementarily coupled to the first light emitting diode and the second light emitting diode and coupled to the first microdisplay to synchronize the data displayed with the first microdisplay to the first light emitting diode and the second light emitting diode.

6. The projection system of claim 1, further comprising:
a third color channel that produces light having a third color, the third color being different than the first color and the second color, the third color channel having at least one light emitting diode that produces light having a fourth range of wavelengths, the fourth range of wavelengths is different than the first range of wavelengths, the second range of wavelengths and the third range of wavelengths, wherein the light having the third color comprises the light having the fourth range of wavelengths; and a third microdisplay positioned between the at least one light emitting diode of the third color channel and the polarization based dichroic element, the third microdisplay positioned to receive and affect at least the light having the fourth range of wavelengths;

wherein the polarization based dichroic element is positioned to receive the light having the third color from the third color channel, the polarization based dichroic element configured to combine the light having the first color, the light having the second color, and the light having the third color.

7. The projection system of claim 6, wherein the second color channel and the third color channel both include a plurality of light emitting diodes and a dichroic element positioned to receive and combine the light from the plurality of light emitting diodes.

8. The projection system of claim 6, wherein the polarization based dichroic element is a polarization dependent X-cube.

9. The projection system of claim 1, wherein the second color channel comprises:
a third light emitting diode that produces the light having the third range of wavelengths and a fourth light emitting diode that produces light have a fourth range of wavelengths, the fourth range of wavelengths being different than the third range of wavelengths; and an other beam combining element positioned to receive the light having the third range of wavelengths and the light having the forth range of wavelengths, the other beam combining element combining the light having the third range of wavelength and the light having the fourth range of wavelengths to produce the light having the second color.

10. A method comprising:
producing light having a first color in a first color channel, wherein producing the light having the first color in the first color channel comprises:
generating light with a first range of wavelengths;
generating light with a second range of wavelengths, the second range of wavelengths being different than the first range of wavelengths;
combining the light with the first range of wavelengths and the light with the second range of wavelengths to form the light having the first color;
producing light having a second color in a second color channel, the second color being different than the first color;
providing image information in the first color in the first color channel, comprising receiving and affecting the light having the first color;
providing image information in the second color in the second color channel, comprising receiving and affecting at least the light having the second color; and
combining the light having the first color from the first color channel and the light having the second color from the second color channel based on polarization states of the light having the first color in the first color channel and the light having the second color in the second color channel.

11. The method of claim 10, wherein the light having the second color includes a third range of wavelengths, wherein at least a portion of the wavelengths in the second range of wavelengths and at least a portion of the wavelengths in the third range of wavelengths are the same wavelengths, and wherein combining the light with the first color from the first color channel and the light with the second color from the second color channel comprises combining the same wavelengths from the second range of wavelengths and the third range of wavelengths.

12. The method of claim 10, further comprising:
polarizing the light having the first color in the first color channel to a first polarization orientation; and
polarizing the light having the second color in the second color channel to a second polarization orientation, the second polarization orientation is orthogonal to the first polarization orientation.

13. The method of claim 12, further comprising:
producing light having a third color in a third color channel, the third color being different than the first color and the second color;
providing image information in the third color in the third color channel; and
combining the light having the third color from the third color channel with the light having the first color from the first color channel and the light having the second color from the second color channel based on the polarization states of the light in the first color channel and the light in the second color channel and a polarization state of the light in the third color channel.

14. The method of claim 13, further comprising polarizing the light having the third color in the third color channel to the first polarization orientation.

15. The method of claim 10, wherein producing the light having the second color in the second color channel comprises:
generating light with a third range of wavelengths, the third range of wavelengths being different than the first range of wavelengths and the second range of wavelengths;
generating light with a fourth range of wavelengths, the fourth range of wavelengths being different than the first range of wavelengths, the second range of wavelengths, and the third range of wavelengths; and
combining the light with the third range of wavelengths and the light with the fourth range of wavelengths.

16. The method of claim 10, wherein providing the image information in the first color in the first color channel and providing the image information in the second color in the second color channel are performed prior to combining the light having the first color from the first color channel with the light having the second color from the second color channel.

17. The method of claim 10, further comprising:
pulse width modulating the light with the first range of wavelengths;
pulse width modulating the light with the second range of wavelengths, wherein the pulse width modulation of the light with the first range of wavelengths is complementary to the pulse width modulation of the light with the second range of wavelengths;
wherein providing the image information in the first color in the first color channel comprises:
providing image information in the light with the first range of wavelengths when the light with the first range of wavelengths is on; and
providing image information in the light with the second range of wavelengths when the light with the second range of wavelengths is on.

18. The method of claim 10, further comprising:
polarizing the light with the first range of wavelengths to a first polarization orientation;
polarizing the light with the second range of wavelengths to a second polarization orientation, the second polarization orientation is orthogonal to the first polarization orientation, wherein combining the light with the first range of wavelengths and the light with the second range of wavelengths retains the orthogonal polarization orientations of the light with the first range of wavelengths and the light with the second range of wavelengths.

19. A projection system, comprising:
a first light emitting diode that produces a first light having a first range of wavelengths;
a second light emitting diode that produces a second light having a second range of wavelengths, the second range of wavelengths being different than the first range of wavelengths;
a first beam combining element positioned to receive the first light and the second light from the first light emitting diode and the second light emitting diode, respectively, the first beam combining element combining the first light and the second light;
a third light emitting diode that produces a third light having a third range of wavelengths, the third range of wavelengths being different than the first range of wavelengths and the second range of wavelengths;
a fourth light emitting diode that produces a fourth light having a fourth range of wavelengths, the fourth range of wavelengths being different than the first range of wavelengths, the second range of wavelengths, and the third range of wavelengths;
a second beam combining element positioned to receive the third light and the fourth light from the third light emitting diode and the fourth light emitting diode, respectively, the second beam combining element combining the third light and the fourth light;
a first microdisplay positioned to receive and affect the first light having a first polarization state to produce a portion of the first light having a second polarization state;
a second microdisplay positioned to receive and affect the second light having the second polarization state to produce a portion of the second light having the first polarization state;
a third microdisplay positioned to receive and affect the third light having the first polarization state to produce a portion of the third light having the second polarization state;
a fourth microdisplay positioned to receive and affect the fourth light having the second polarization state to produce a portion of the fourth light having the first polarization state;
a polarization based dichroic element, comprising:
a first polarizing beam splitter having a first face for receiving the first light and the second light from the first beam combining element, a second face coupled to the first microdisplay, a third face coupled to the second microdisplay, and a fourth face through which the portion of the first light and the portion of the second light exit;
a second polarizing beam splitter having a first face for receiving the third light and the fourth light from the second beam combining element, a second face coupled to the third microdisplay, a third face coupled to the fourth microdisplay, and a fourth face through which the portion of the third light and the portion of the fourth light exit; and
a third polarizing beam splitter having a first face for receiving the portion of the first light and the portion of the second light from the fourth face of the first polarizing beam splitter, a second face for receiving the portion of the third light and the portion of the fourth light from the fourth face of the second polarizing beam splitter, and a third face through which the portion of the first light, the portion of the second light, the portion of the third light, and the portion of the fourth light exit.

20. The projection system of claim 19, wherein the first beam combining element is a reflective polarizing element that reflects the first light to produce the first light having the first polarization state and transmits the second light to produce the second light having the second polarization state, and the second beam combining element is another reflective polarizing element that reflects the third light to produce the third light having the first polarization state and transmits the fourth light to produce the fourth light having the second polarization state.

21. The projection system of claim 20, further comprising:
a mirror adjacent to the first beam combining element for polarization recycling any lost light from the first beam combining element; and
a mirror adjacent to the second beam combining element for polarization recycling any lost light from the second beam combining element.

22. The projection system of claim 19, further comprising:
a first filter between the fourth face of the first polarizing beam splitter and the first face of the third polarizing beam splitter, the first filter changing the polarization state of the portion of the first light to the first polarization state; and
a second filter between the fourth face of the second polarizing beam splitter and the second face of the third polarizing beam splitter, the second filter changing the polarization state of the portion of the fourth light to the second polarization state.

23. The projection system of claim 22, further comprising:
a third filter on the third face of the third polarizing beam splitter, the third filter changing the polarization states of the portion of the third light and the portion of the fourth light to the first polarization state.

24. A method comprising:
generating a first light with a first range of wavelengths;
generating a second light with a second range of wavelengths, the second range of wavelengths being different than the first range of wavelengths;
combining the first light and the second light;
separating the first light from the second light based on their different polarization states;
providing image information in the first light by reflecting and producing a portion of the first light having a new polarization state;
providing image information in the second light by reflecting and producing a portion of the second light with a new polarization state;
combining the portion of the first light and the portion of the second light based on their different polarization states;
generating a third light with a third range of wavelengths, the third range of wavelengths being different than the first range of wavelengths and the second range of wavelengths;
generating a fourth light with a fourth range of wavelengths, the fourth range of wavelengths being different than the first range of wavelengths, the second range of wavelengths, and the fourth range of wavelengths;
combining the third light and the fourth light;
separating the third light from the fourth light based on their different polarization states;
providing image information in the third light by reflecting and producing a portion of the third light with a new polarization state;
providing image information in the fourth light by reflecting and producing a portion of the fourth light with a new polarization state;
combining the portion of the third light and the portion of the fourth light based on their different polarization states; and
combining the portion of the first light, the portion of the second light, the portion of the third light, and the portion of the fourth light based on their different polarization states.

25. The method of claim 24, wherein;
combining the first light and the second light comprises reflecting the first light to produce the first light having a first polarization state and transmitting the second light to produce the second light having a second polarization state; and
combining the third light and the fourth light comprises reflecting the third light to produce the third light having the first polarization state and transmitting the fourth light to produce the fourth light having the second polarization state.

26. The method of claim 25, further comprising:
polarization recycling any lost light from combining the first light and the second light and from combining the third light and the fourth light.

27. The method of claim 24, further comprising:
changing the polarization state of the portion of the first light after combining the portion of the first light and the portion of the second light and before combining the portion of the first light, the portion of the second light, the portion of the third light, and the portion of the fourth light; and
changing the polarization state of the portion of the fourth light after combining the portion of the third light and the portion of the fourth light and before combining the portion of the first light, the portion of the second light, the portion of the third light, and the portion of the fourth light.

28. The method of claim 27, further comprising:
changing the polarization states of the portion of the third light and the portion of the fourth light to the first polarization state after combining the portion of the first light, the portion of the second light, the portion of the third light, and the portion of the fourth light.

* * * * *